(12) United States Patent
Itokawa et al.

(10) Patent No.: US 8,576,925 B2
(45) Date of Patent: Nov. 5, 2013

(54) IMAGE PROCESSING APPARATUS AND IMAGE PROCESSING METHOD, AND PROGRAM

(75) Inventors: Osamu Itokawa, Akishima (JP); Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 12/423,293

(22) Filed: Apr. 14, 2009

(65) Prior Publication Data

US 2009/0273611 A1 Nov. 5, 2009

(30) Foreign Application Priority Data

Apr. 30, 2008 (JP) ................ 2008-119059

(51) Int. Cl.
*H04N 7/12* (2006.01)
*H04N 11/02* (2006.01)
*H04N 11/04* (2006.01)

(52) U.S. Cl.
USPC ............ 375/240.29; 375/240.01; 375/240.2

(58) Field of Classification Search
USPC ...................................... 375/240
See application file for complete search history.

(56) References Cited

U.S. PATENT DOCUMENTS

| 5,528,313 | A * | 6/1996 | Tanaka et al. ........ 348/699 |
| 6,278,445 | B1 | 8/2001 | Tanaka et al. ........ 345/178 |
| 7,058,128 | B1 | 6/2006 | Itokawa ............ 375/240.08 |
| 2006/0119617 | A1 * | 6/2006 | Toyooka et al. ....... 345/619 |

FOREIGN PATENT DOCUMENTS

| JP | 11-136541 A | 5/1999 |
| JP | 2002-351382 A | 12/2002 |
| JP | 2006-184896 | 7/2006 |

OTHER PUBLICATIONS

Chen et al., "P-44: Smooth Frame Insertion Method for Motion-Blur Reduction in LCDs", Proceedings of the Twenty-Fifth International Display Research Conference, Sep. 2005, pp. 359-361, Society for Information Display, Edinburgh, Scotland.
Van Heesch et al., "Spatio-Temporal Frequency Analysis of Motion Blur Reduction on LCDS", Proceedings of the International Conference on Image Processing, Sep. 2007, pp. 401-404, vol. 4, IEEE, San Antonio, Texas.
Extended European search report issued on Sep. 23, 2011, in counterpart application EP 09157953.
Japanese Office Action issued on Oct. 22, 2012, in counterpart Japanese application No. 2008-119059.

* cited by examiner

*Primary Examiner* — Joseph Ustaris
*Assistant Examiner* — Mikhail Itskovich
(74) *Attorney, Agent, or Firm* — Fitzpatrick, Cella, Harper & Scinto

(57) ABSTRACT

An image processing apparatus which converts a frame rate by dividing an input frame into subframes and outputting the subframes, comprises, a preprocessing unit adapted to perform preprocessing of replacing a pixel value of a pixel of interest with a minimum pixel value of peripheral pixels of the pixel of interest in an input frame, a low-pass filter processing unit adapted to generate a first subframe by performing a low-pass filtering process on the input frame having undergone the preprocessing, a generating unit adapted to generate a second subframe from the first subframe and the input frame, and a switching unit adapted to output the first subframe and the second subframe by switching the first subframe and the second subframe at a predetermined timing.

16 Claims, 20 Drawing Sheets

FIG. 9
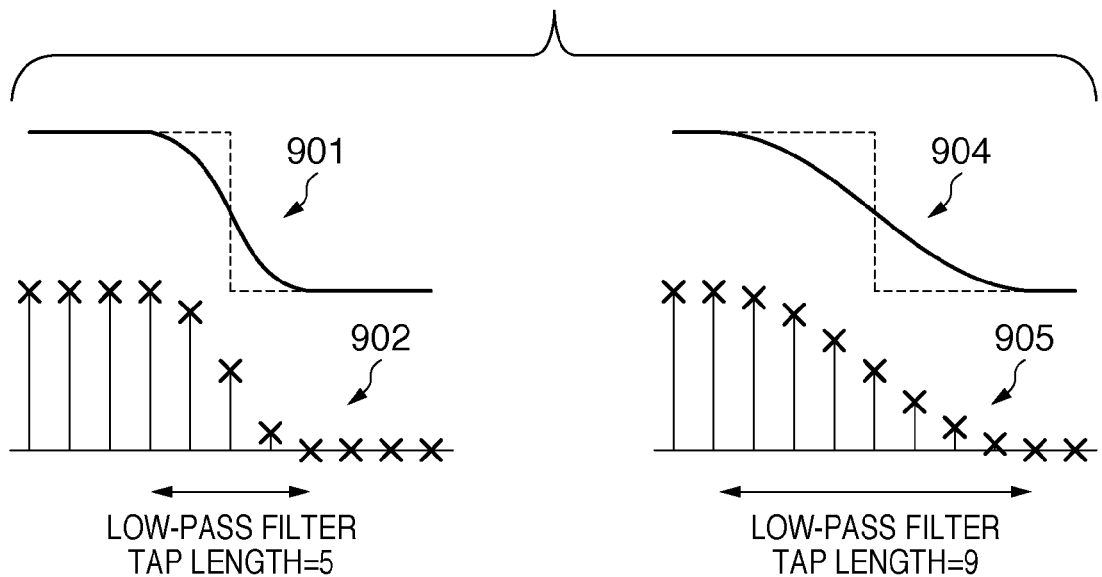
LOW-PASS FILTER
TAP LENGTH=5
LOW-PASS FILTER
TAP LENGTH=9
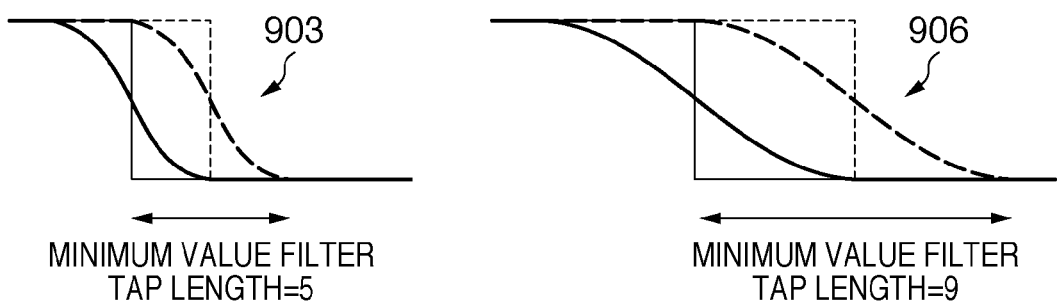
MINIMUM VALUE FILTER
TAP LENGTH=5
MINIMUM VALUE FILTER
TAP LENGTH=9
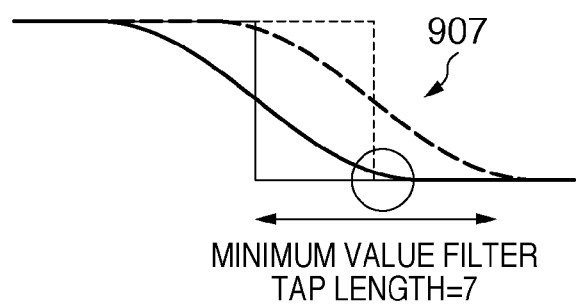
MINIMUM VALUE FILTER
TAP LENGTH=7

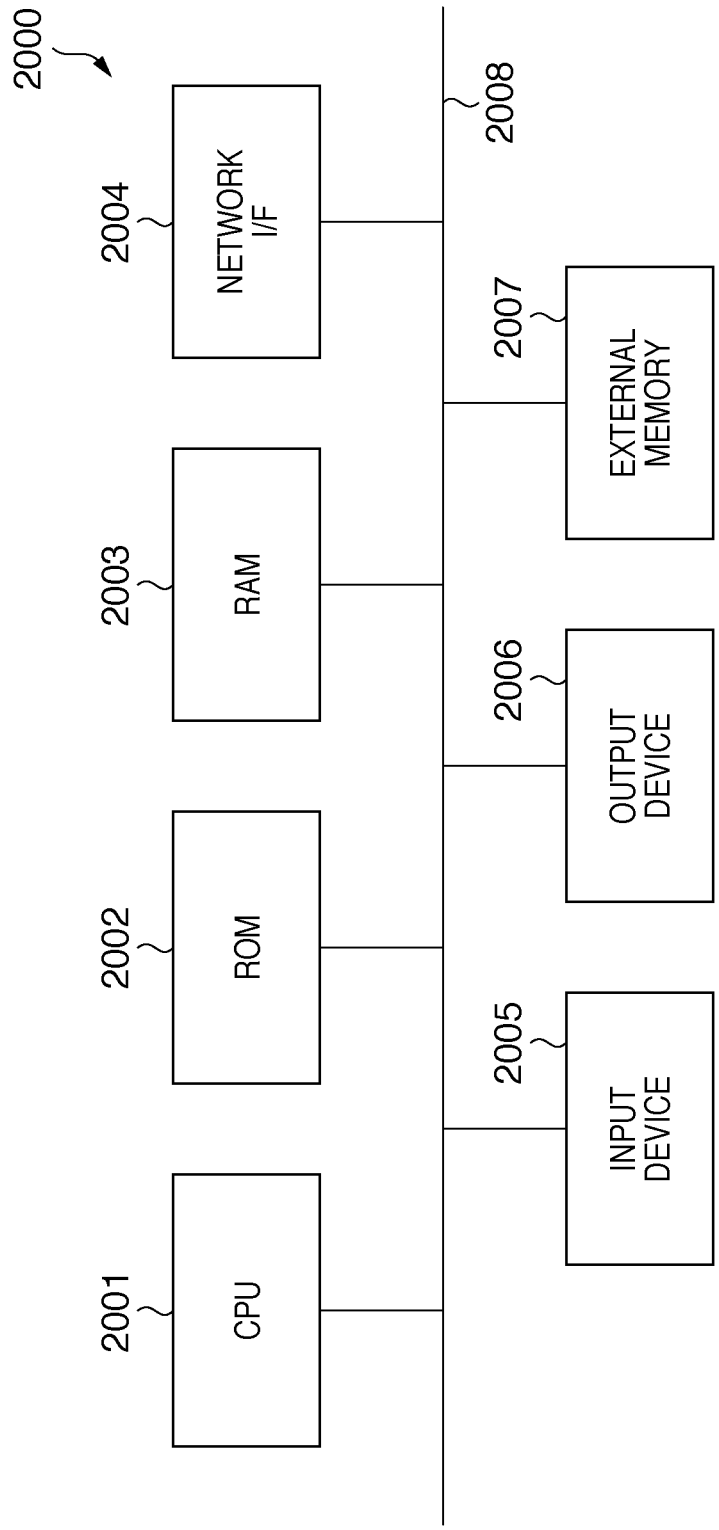

IMAGE PROCESSING APPARATUS AND IMAGE PROCESSING METHOD, AND PROGRAM

BACKGROUND OF THE INVENTION

1. Field of the Invention

The present invention relates to moving image processing for frame rate conversion and, more particularly, to a conversion process of performing conversion to a higher frame rate, for example, converting a 60 Hz image into a 120 Hz image.

2. Description of the Related Art

A CRT has long been used as a moving image display device represented by a television receiver, but a panel using a liquid crystal device is recently most frequently used. Features of the liquid crystal device will be explained below with reference to FIG. 10. Referring to FIG. 10, the abscissa indicates the time, and the ordinate indicates the brightness of a pixel. The frame rate is 60 Hz. As shown in FIG. 10, the liquid crystal device holds light emission for 1/60 sec, and hence is called a "hold type" device.

The hold type device has the drawback that blur easily occurs in a motion. FIG. 11 is a view for explaining this drawback. Referring to FIG. 11, the abscissa indicates the position on the screen, and the ordinate indicates the time. FIG. 11 shows an example in which rectangle waves move from the left to the right on the screen. When the eye follows this motion, a state in which a pixel stays in the same position for 1/60 sec in the motion followed by the eye is a relative delay to the motion. If the hold time is long, the delay increases its width and is perceived as a blur of the motion on the screen. A lowermost FIG. 1101 in FIG. 11 shows the way the motion followed by the eye looks, and demonstrates that a blur having a certain width is perceived on each edge.

An example of a measure to counter this motion blur is a method of shortening the hold time by raising the driving frequency. FIG. 12 shows an example in which an image is displayed at 120 Hz as a double frequency. Referring to FIG. 12, the abscissa indicates the time, and the ordinate indicates the brightness of a pixel. As a method of thus doubling the frame rate, a method of displaying an input image by dividing it into an image containing a high-frequency component and an image containing only a low-frequency component in the time direction is known. FIG. 13 shows the dynamic characteristic of an image having undergone double-speed drive performed by this method. Similar to FIG. 11, the abscissa indicates the position on the screen and the ordinate indicates the time in FIG. 13 as well. A lowermost FIG. 1301 in FIG. 13 shows the way a motion followed by the eye looks. Comparison with the FIG. 1101 shown in FIG. 11 reveals that a motion blur is largely reduced in the FIG. 1301 shown in FIG. 13.

Also, as a device having the same light emission characteristic as that of the CRT, a field emission type display device is being extensively developed. FIG. 14 is a view for explaining the light emission characteristic of this device. Similar to FIG. 10, the abscissa indicates the time, and the ordinate indicates the brightness of a pixel. A display device of this type is called an "impulse type" device because the device emits light in a moment of 1/60 sec.

The impulse type device repetitively turns on and off light emission with a period of 1/60 sec, and hence has the drawback that this ON/OFF of light emission is readily perceived as a flicker. Since the flicker becomes conspicuous as the area increases, the flicker often poses a problem in recent display devices having large screens.

FIG. 15 shows the dynamic characteristic of the impulse type device. Referring to FIG. 15, the abscissa indicates the position on the screen, and the ordinate indicates the time. Unlike the characteristic of the hold type device, the most significant feature is that no motion blur perceivable as an afterimage occurs.

It is possible to raise the driving frequency as a measure to cope with the flicker as well. FIG. 16 shows an example in which an image is displayed at 120 Hz as a double frequency. Referring to FIG. 16, the abscissa indicates the time, and the ordinate indicates the brightness of a pixel. In the impulse type device, the brightness of one light emission can be obtained by displaying the half level of the brightness of one light emission twice.

FIG. 17 shows the dynamic characteristic when displaying an input image by dividing it into an image containing a high-frequency component and an image containing only a low-frequency component in the time direction. If the same frame is simply displayed twice, two frames overlap each other. However, since the high-frequency image is displayed only once, only a blur caused by the low-frequency component occurs. This suppresses visual deterioration.

As described above, the method of dividing a frame image into two subframes in accordance with frequency components is effective as the measure to cope with the motion blur in the hold type display device, or as the measure to counter the flicker in the impulse type display device.

Japanese Patent Laid-Open No. 2006-184896 describes a method of implementing hold type double-speed driving. FIG. 18 shows a part of the circuit configuration.

An input frame 1801 as an input image to the circuit is input to a low-pass filter processor 1802, difference detector 1803, and adder 1805. The low-pass filter processor 1802 generates a subframe containing only a low-frequency component of the input frame 1801. The difference detector 1803 detects the difference between the input frame 1801 and the subframe generated by the low-pass filter processor 1802 and containing only the low-frequency component, thereby extracting a high-frequency component. The adder 1805 adds the extracted high-frequency component and input frame 1801. Consequently, a subframe having an emphasized high-frequency component can be obtained. A switching circuit 1806 switches the subframe containing only the low-frequency component and the subframe having the emphasized high-frequency component with a period of 120 Hz, thereby supplying an output frame 1807 to the subsequent processing. The subsequent processing reproduces the original frame image when viewed with a time period of 60 Hz by alternately displaying the subframe from which the high-frequency component is removed and the subframe having the emphasized high-frequency component.

SUMMARY OF THE INVENTION

Unfortunately, in the double-speed driving method using the circuit shown in FIG. 18, the apparent frame image obtained by synthesizing the two subframes is sometimes not the same as the original frame image.

The present invention provides a moving image processing technique that does not deteriorate the image quality when displaying a still image even if the input image undergoes double-speed driving using the technique of dividing the input image into the image containing the high-frequency component and the image containing the low-frequency component in the time direction and displaying the input image.

According to one aspect of embodiments, the present invention relates to an image processing apparatus which converts a frame rate by dividing an input frame into subframes and outputting the subframes, comprising, a preprocessing unit adapted to perform preprocessing of replacing a pixel value of a pixel of interest with a minimum pixel value of peripheral pixels of the pixel of interest in an input frame, a low-pass filter processing unit adapted to generate a first subframe by performing a low-pass filtering process on the input frame having undergone the preprocessing, a generating unit adapted to generate a second subframe from the first subframe and the input frame, and a switching unit adapted to output the first subframe and the second subframe by switching the first subframe and the second subframe at a predetermined timing.

According to another aspect of embodiments, the present invention relates to an image processing apparatus comprising, an input unit adapted to input a plurality of frames, a replacing unit adapted to replace a pixel value of a pixel of interest with a pixel value, smaller than that of the pixel of interest, of pixel values of peripheral pixels of the pixel of interest in an input frame, a generating unit adapted to generate a high-frequency enhanced image and a low-frequency enhanced image from a frame, the pixel value of which has been replaced by the replacing unit, and an output unit adapted to output the high-frequency enhanced image and the low-frequency enhanced image by switching the high-frequency enhanced image and the low-frequency enhanced image.

Further features of the present invention will become apparent from the following description of exemplary embodiments with reference to the attached drawings.

BRIEF DESCRIPTION OF THE DRAWINGS

FIG. 9 is a view for explaining the relationship between the numbers of taps of a low-pass filter and minimum value filter according to the second embodiment of the present invention;

FIG. 20 is a view showing an example of the hardware configuration of an image processing apparatus according to an embodiment of the present invention.

DESCRIPTION OF THE EMBODIMENTS

Embodiments of the present invention will be explained below with reference to the accompanying drawings.

Figure 18:
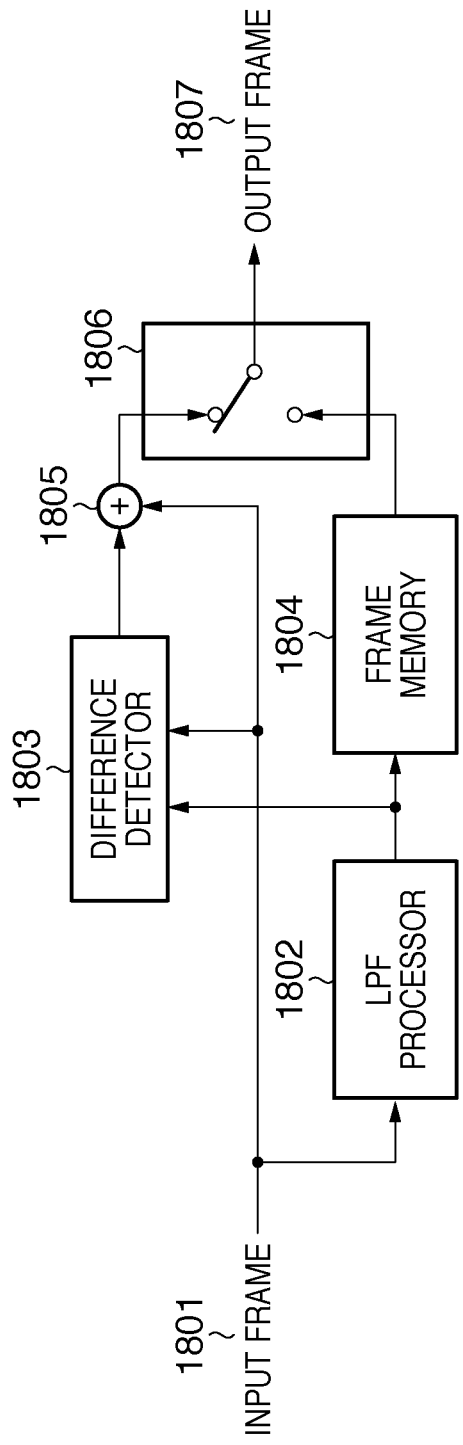
FIG. 18 is a view for explaining a conventional circuit configuration.
Figure 19:
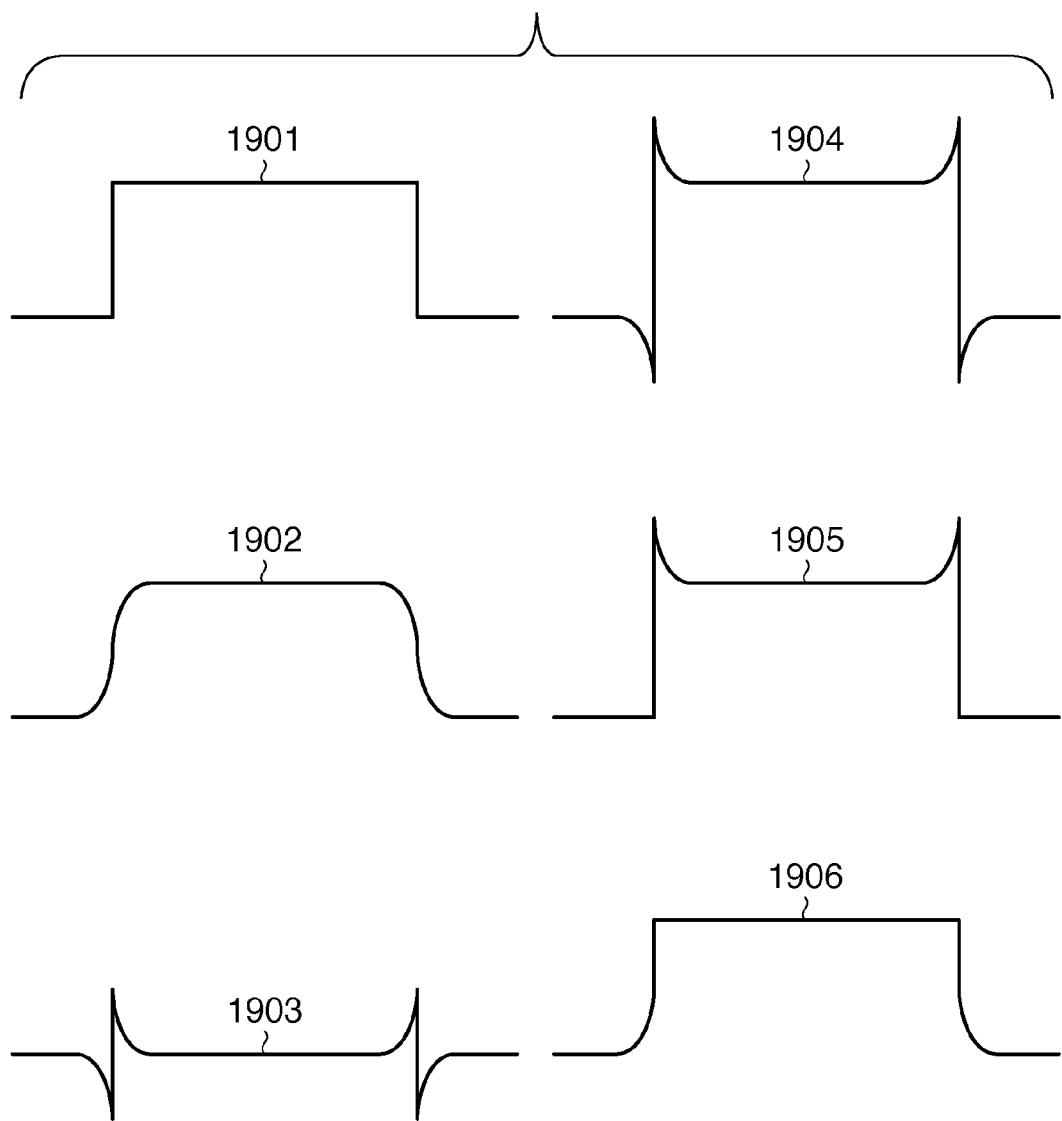
FIG. 19 is a view for explaining processed waveforms in a conventional method.

In the double-speed driving method using the circuit shown in FIG. 18, the apparent frame image obtained by synthesizing the two subframes is sometimes not the same as the original frame image. This will be explained below with reference to FIG. 19. A waveform 1901 indicates an example of the waveform of an input frame image. A waveform 1902 is an output waveform obtained by performing a low-pass filtering process on the waveform 1901 of the input frame image by the LPF processor 1802 shown in FIG. 18. A waveform 1903 is an output waveform obtained by detecting the difference by the difference detector 1803 in FIG. 18. The waveform 1903 takes positive and negative values because it contains a high-frequency component. A waveform 1904 is obtained by adding the waveform 1903 containing the high-frequency component to the original input waveform 1901.

Theoretically, the apparent waveform is supposed to become the same as the waveform 1901 when the waveforms 1902 and 1903 are alternately displayed with a period of 120 Hz. However, the waveform 1904 takes a negative value if a low-luminance-level portion of the waveform 1901 is zero or close to zero.

Since an image having a negative value cannot be displayed, a negative value is in practice displayed as zero as indicated by a waveform 1905. Consequently, the apparent synthetic waveform looks like a waveform 1906 because the waveforms 1902 and 1905 are alternately displayed. When a white character exits in a black background, for example, a viewer perceives an image having blurred character contours. As described above, an image having undergone divided drive does not look the same as the original input image and is perceived as deterioration depending on the waveform of the input image. The present invention provides the first to third embodiments below as inventions for solving this problem.

First Embodiment

Figure 1:
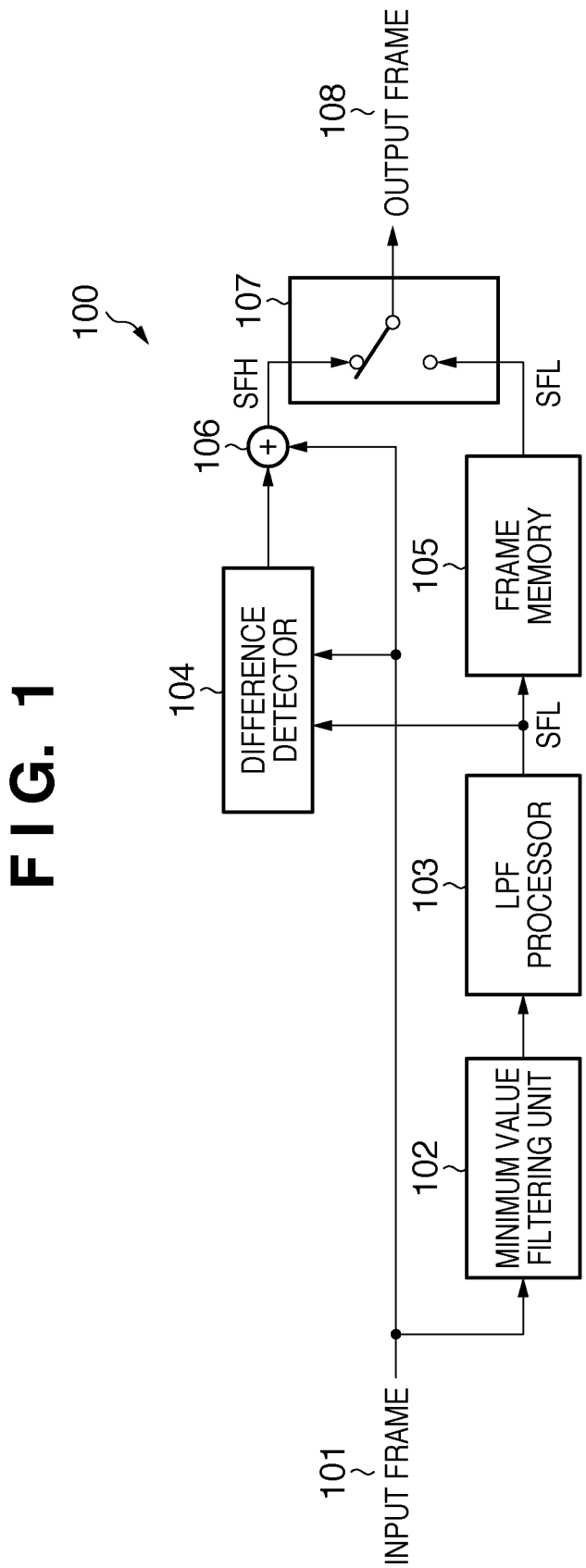
FIG. 1 is a view showing an example of an image processing apparatus for performing double-speed driving in a hold type display device according to the first embodiment of the present invention.
Figure 2:
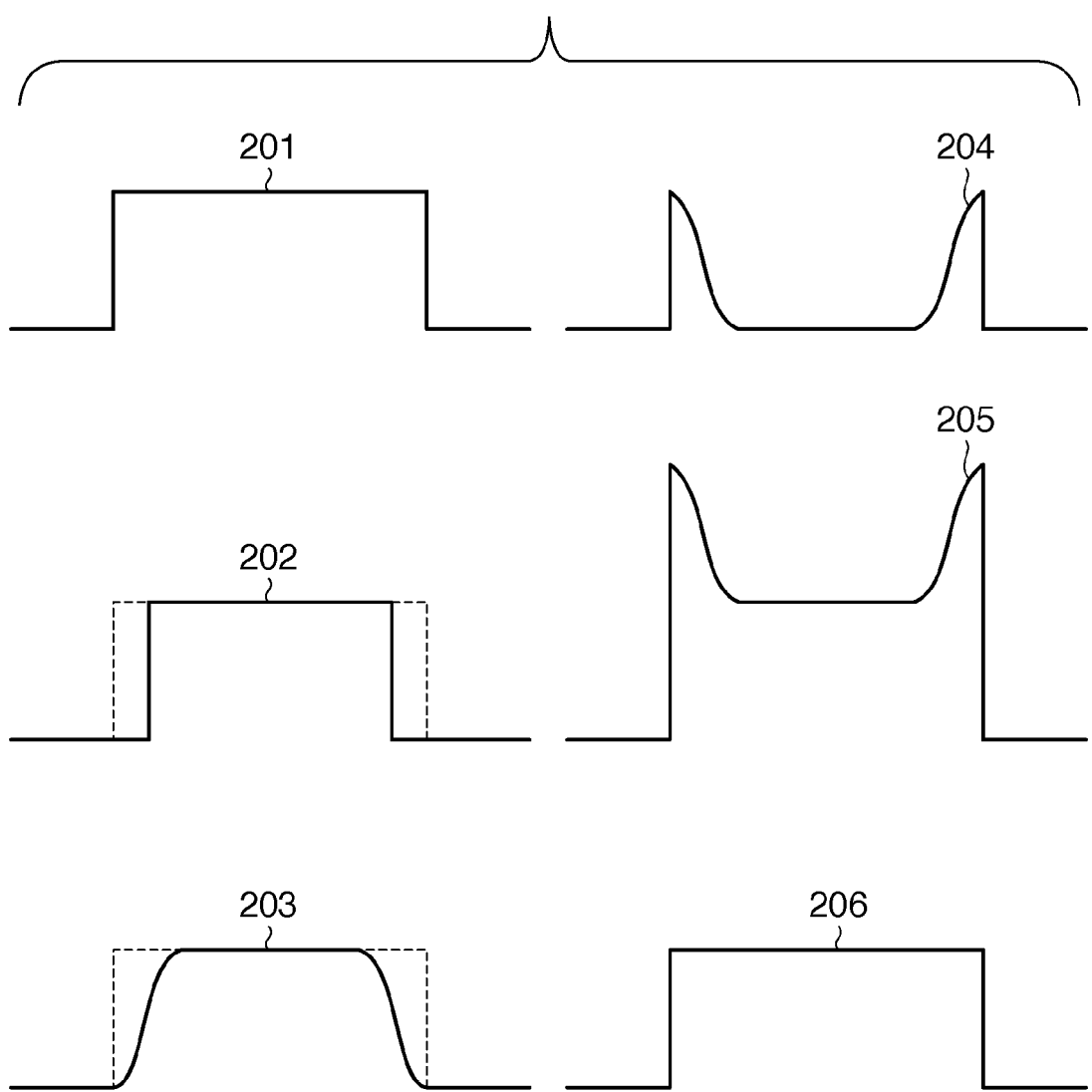
FIG. 2 is a view for explaining processed waveforms according to the first embodiment of the present invention.

The first embodiment of the present invention will be explained below with reference to a block diagram shown in FIG. 1 and examples of processed waveforms shown in FIG. 2. FIG. 1 is a view showing an example of an image processing apparatus 100 for performing a double-speed driving in a hold type display device according to the first embodiment of the present invention. FIG. 2 is a view for explaining processed waveforms according to the first embodiment of the present invention.

In this embodiment, an example suitable for a hold type display device such as a liquid crystal display device will be explained as the image processing apparatus 100. Referring to FIG. 1, an input frame 101 as an input image is divided into two frames in order to generate a first subframe containing only a low-frequency component and a second subframe containing a high-frequency component. First, a method of generating the first subframe containing only the low-frequency component will be explained.

A minimum value filtering unit 102 performs a minimum value filtering process of selecting a minimum value of pixels in a block, as preprocessing of a low-pass filtering process performed by a low-pass filter processor 103. In this process, a block having a predetermined size (e.g., 9×9) is set for a pixel of interest in the input frame 101. A pixel having a minimum pixel value is selected from peripheral pixels of the pixel of interest in the block, and the pixel value of the pixel of interest is replaced with this minimum pixel value.

Referring to FIG. 2, a waveform 201 represents an example of the input waveform. A waveform 202 is obtained by performing the minimum value filtering process on the input waveform 201 by the minimum value filtering unit 102. In the input frame 101, the pixel value of a low-luminance pixel is selected in a boundary portion where the pixel value of a high-luminance pixel and the pixel value of the low-luminance pixel are adjacent to each other. Consequently, each edge boundary is narrowed inside the high-luminance region as indicated by the waveform 202.

Then, the low-pass filter processor 103 performs a two-dimensional, low-pass filtering process on this subframe having the narrowed high-luminance region. The function of the low-pass filter is not particularly defined. For example, it is possible to use a Gaussian function, or a running average or weighted running average filter. A waveform 203 is obtained by performing the low-pass filtering process on the waveform 202.

The generation of the first subframe containing only the low-frequency component is completed by thus performing the minimum value filtering process and low-pass filtering process on the input frame 101. The first subframe is temporarily stored in a frame memory 105. The frame memory 105 functions as a buffer for temporarily storing the first subframe, but need not independently exist. For example, the frame memory 105 may also be included in a switching circuit 107.

A method of generating the second subframe containing the high-frequency component will now be explained. A difference detector 104 receives the input frame 101 and the first subframe from the low-pass filter processor 103. The difference detector 104 obtains a difference image by subtracting the first subframe containing only the low-frequency component from the input frame 101.

Referring to FIG. 2, a waveform 204 obtained by subtracting the waveform 203 from the waveform 201 is the difference image. An adder 106 adds the difference image having the waveform 204 output from the difference detector 104 and the input frame 101 having the waveform 201, thereby completing the generation of the second subframe containing the high-frequency component. A waveform 205 shown in FIG. 2 indicates the second subframe containing the high-frequency component.

The switching circuit 107 switches the first and second subframes at a desired timing, for example, with a period of 120 Hz when the input period is 60 Hz, thereby outputting an output frame to the subsequent processing circuit. Note that the switching circuit 107 may also include a buffer circuit for temporarily storing the input subframe until each output timing comes.

In this manner, the first and second subframes are alternately displayed. When the first subframe having the waveform 203 and the second subframe having the waveform 205 shown in FIG. 2 are alternately displayed at high speed, the displayed waveform looks like a waveform 206. Accordingly, a viewer can perceive the waveform 206 as the same waveform as the waveform 201 of the input frame 101 in 60-Hz display. Color image processing is often separately performed for three types of image data such as R, G, and B or Y, Cb, and Cr. However, the series of processes of the present invention can be performed for each of R, G, and B, and can also be performed for Y alone. It is of course also possible to calculate Y from R, G, and B, and apply the result to R, G, and B.

The processing according to this embodiment described above will be explained in more detail below with reference to a flowchart shown in FIG. 3.

First, in step S301, necessary initialization is performed. In this step, the filter size of the minimum value filter, the static characteristic of the low-pass filter, and the like are set. In step S302, the frame image 101 is input. In the example shown in FIG. 2, the waveform 201 is input. In step S303, the minimum value filtering unit 102 performs the minimum value filtering process on the input frame 101. In this minimum value filtering process, a minimum value in the filter region is selected. In the example shown in FIG. 2, the waveform 202 indicates the result of the minimum value filtering process, and the broken lines indicate the original input waveform 201.

In step S304, the low-pass filter processor 103 performs the low-pass filtering process on the output frame image from the minimum value filtering unit 102. In the example shown in FIG. 2, the waveform 203 is the result of the low-pass filtering process performed on the waveform 202. In this way, the generation of the first subframe containing only the low-frequency component is completed.

Subsequently, in step S305, the difference detector 104 subtracts the first subframe from the input frame 101, thereby detecting the difference. Referring to FIG. 2, the waveform 204 indicates the difference waveform. A significant feature of this embodiment is that the difference waveform 204 takes no negative value because the minimum value filter is used in step S303.

In step S306, the adder 106 adds the input frame 101 and the output from the difference detector 104. This process is performed to compensate for the high-frequency component removed from the first subframe by adding the high-frequency component to the input frame 101. The adder 106 outputs the second subframe containing the high-frequency component. In the example shown in FIG. 2, the waveform 205 indicates the second subframe.

In step S307, the switching circuit 107 checks the frame output timing, and the process advances to step S308 if the timing is the output timing of the first subframe ("YES" in step S307). In step S308, the first subframe is output. Note that the first subframe is temporarily stored in the frame memory 105 or in the internal buffer circuit of the switching circuit 107, and output as an output frame 108 from the switching circuit 107 at the output timing.

After the first subframe is output, whether the timing is the output timing of the second subframe is determined in step S309. If the timing is the second subframe output timing ("YES" in step S309), the second subframe is output in step S310. Note that the second subframe may also be temporarily stored in the internal buffer circuit of the switching circuit 107, and output as the output frame 108 from the switching circuit 107 at the output timing.

After that, if all the frames are completely processed ("YES" in step S311), this processing is terminated. If there is an unprocessed frame ("NO" in step S311), the process returns to step S302 to repeat the processing.

Figure 3:
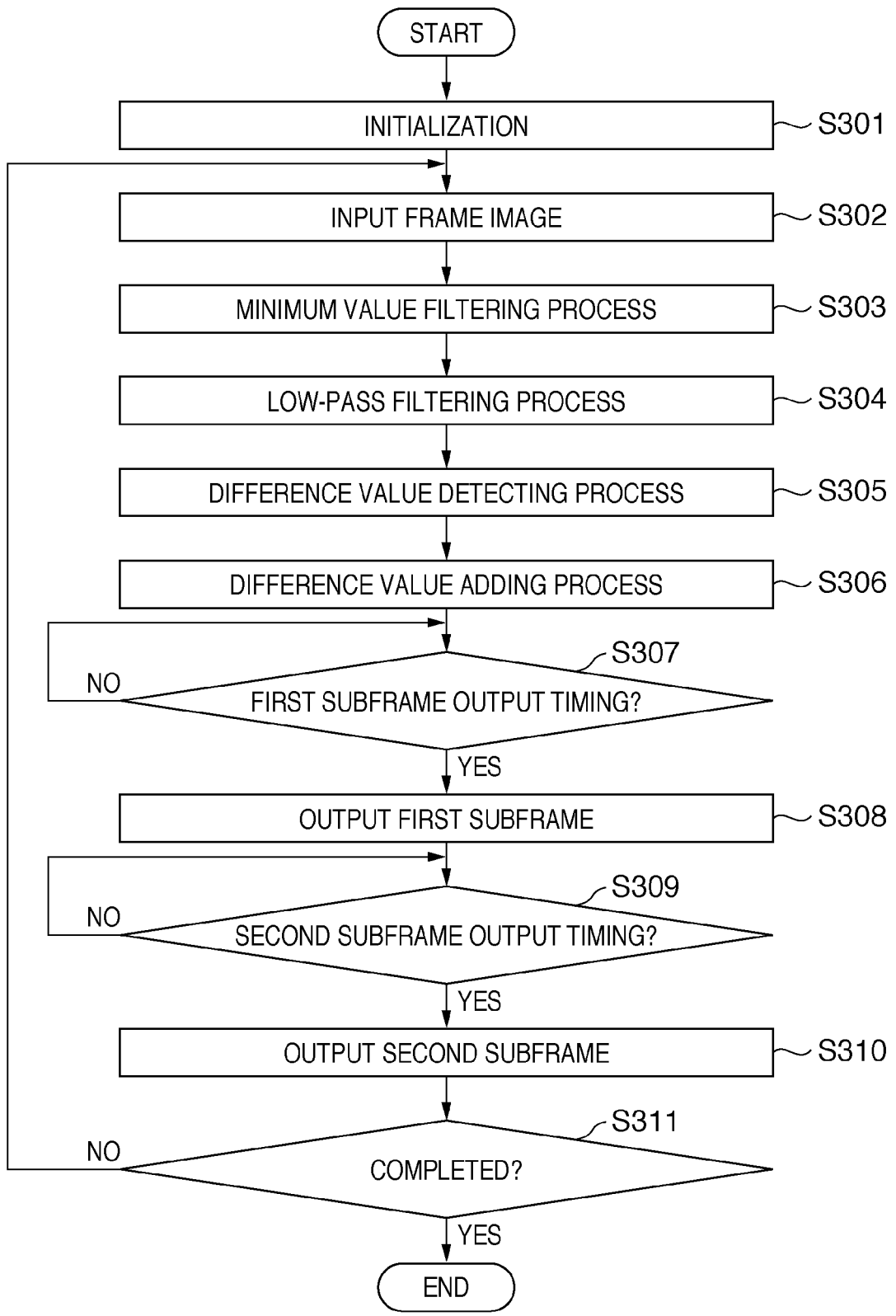
FIG. 3 is a flowchart showing a procedure according to the first embodiment of the present invention.

Note that the subframe output order explained in the flowchart shown in FIG. 3 is merely an example, and the present invention is not limited to this. That is, the first subframe may also be output after the second subframe is output. Note also that the output timing is checked after the two subframes are formed, but the embodiment of the present invention is not limited to this. For example, it is also possible to check the first subframe output timing when the low-pass filtering process is completed in step S304, and generate the second subframe by performing the difference value detecting process after the first subframe is output.

In the hold type display device as described above, the first subframe is displayed for the first 1/120 sec, and the second subframe is displayed for the next 1/120 sec. The apparent waveform on the time average of 1/60 sec is the waveform 206 shown in FIG. 2, that is, the same as that of the input frame 201. Note that the subframes can also be displayed for a time period shorter than 1/120 sec by improving the liquid crystal response characteristic or controlling the backlight. For example, subframes are output at 1/240 sec when the switching circuit 107 switches an input 60-Hz image between the first and second subframes for a period of 240 Hz. Even in this case, however, a waveform looking the same as the input waveform is generated at a time period of 1/60 sec, that is, the feature of the present invention remains the same.

Second Embodiment

Figure 4:
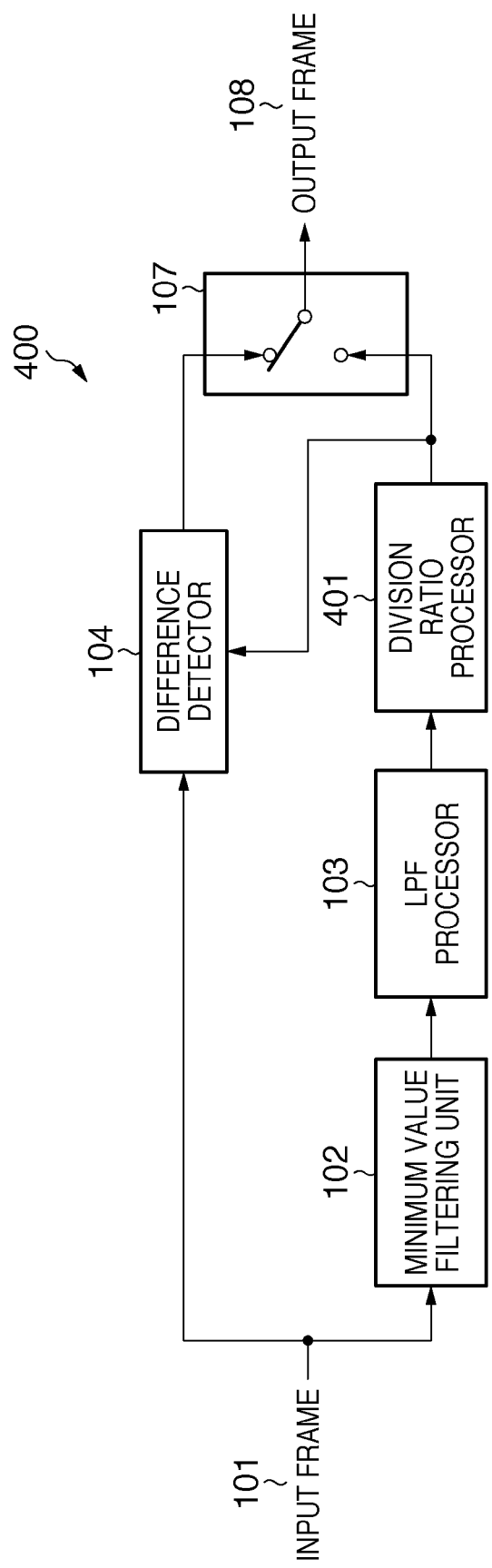
FIG. 4 is a view showing an example of an image processing apparatus for performing double-speed driving in an impulse type display device according to the second embodiment of the present invention.
Figure 5:
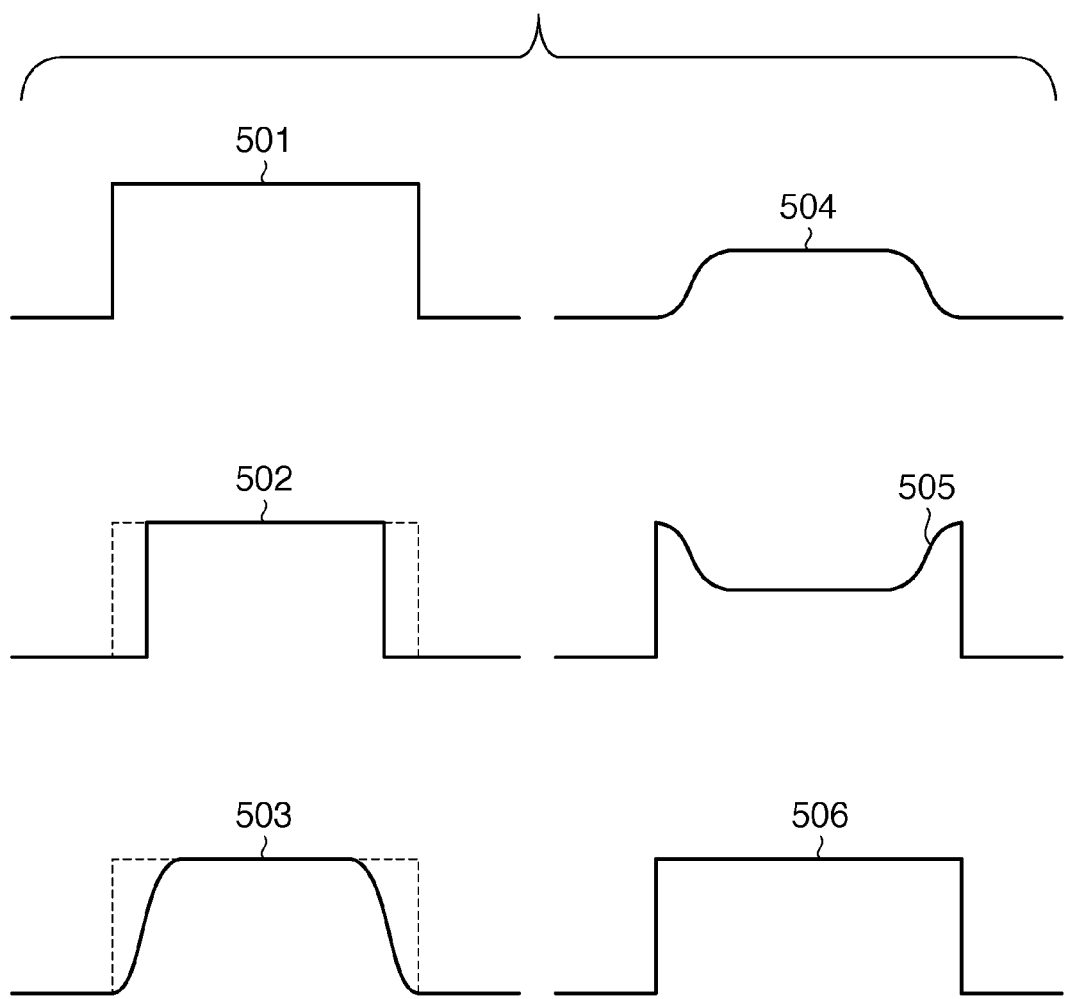
FIG. 5 is a view for explaining processed waveforms according to the second embodiment of the present invention.

The second embodiment of the present invention will be explained below with reference to a block diagram shown in FIG. 4 and examples of processed waveforms shown in FIG. 5. FIG. 4 is a view showing an example of an image processing apparatus 400 for performing double-speed driving in an impulse type display device according to the second embodiment of the present invention. FIG. 5 is a view for explaining processed waveforms according to the second embodiment of the present invention.

In this embodiment, an example of the impulse type display device such as a field emission type display device will be explained as the image processing apparatus 400. Referring to FIG. 4, the same reference numerals as in FIG. 1 denote processing blocks that achieve the same functions as those of the processing blocks included in the image processing apparatus shown in FIG. 1.

Referring to FIG. 4, an input frame 101 as an input image is divided into two frames in order to generate a first subframe containing only a low-frequency component and a second subframe containing a high-frequency component as in the first embodiment. First, a method of generating the first subframe containing only the low-frequency component will be explained.

A minimum value filtering unit 102 performs a minimum value filtering process of selecting a minimum value of pixels in a block, as preprocessing of a low-pass filtering process performed by a low-pass filter processor 103. This process is the same as that in the first embodiment.

Referring to FIG. 5, a waveform 501 represents an example of the input waveform. A waveform 502 is obtained by performing the minimum value filtering process on the input waveform 501 by the minimum value filtering unit 102. In the input frame 101, the pixel value of a low-luminance pixel is selected in a boundary portion where the pixel value of a high-luminance pixel and the pixel value of the low-luminance pixel are adjacent to each other. Consequently, each edge boundary is narrowed inside the high-luminance region as indicated by the waveform 502.

Then, the low-pass filter processor 103 performs a two-dimensional, low-pass filtering process on this subframe having the narrowed high-luminance region. The function of the low-pass filter is not particularly defined. For example, it is possible to use a Gaussian function, or a running average or weighted running average filter. A waveform 503 is obtained by performing the low-pass filtering process on the waveform 502.

A division ratio processor 401 determines the ratio at which the two subframes emit light. To make a flicker difficult to perceive, the brightness difference between the two subframes is desirably small. Accordingly, an example of fifty-fifty division will be explained in this embodiment. A waveform 504 shown in FIG. 5 is obtained by multiplying the waveform 503 by 0.5. In this embodiment, the waveform 504 is the first subframe containing only the low-frequency component.

The generation of the first subframe containing only the low-frequency component is completed by thus performing the minimum value filtering process and low-pass filtering process on the input frame 101, and applying the division ratio. The first subframe is output to a switching circuit 107.

A method of generating the second subframe containing the high-frequency component will now be explained. A difference detector 104 subtracts the first subframe from the input frame 101, and outputs the difference as the second subframe. A waveform 505 shown in FIG. 5 indicates the waveform of the second subframe.

The switching circuit 107 switches the two subframes at a desired timing, for example, at a period of 120 Hz when the input period is 60 Hz, thereby outputting an output frame to the subsequent processing circuit. Note that the switching circuit 107 may also include a buffer circuit for temporarily storing the input subframe until each output timing comes.

When the first subframe having the waveform 504 and the second subframe having the waveform 505 shown in FIG. 5 are alternately displayed at high speed, the displayed waveform looks like a waveform 506. Accordingly, a viewer can perceive the waveform 506 as the same waveform as the waveform 501 of the input frame 101 in 60-Hz display. Color image processing is the same as that of the first embodiment.

As described above, the hold type device and impulse type device generate subframes in different forms. In both the hold type device and impulse type device, however, no negative value is produced when subtracting the subframe containing only the low-frequency component from the input frame.

The processing according to this embodiment described above will be explained in more detail below with reference to a flowchart shown in FIG. 6.

First, processes in steps S601 to S604 are the same as those in steps S301 to S304 of the flowchart shown in FIG. 3, so a repetitive explanation will be omitted.

Subsequently, in step S605, the division ratio processor 401 performs the dividing process. This dividing process determines the division ratio, that is, determines the percentage of the subframe containing only the low-frequency component in the whole frame. In this embodiment, the division ratio is unconditionally 50% regardless of a pixel value. In the example shown in FIG. 5, the waveform 504 having brightness half that of the waveform 503 obtained by the low-pass filtering process is obtained by multiplying the waveform 503 by 0.5. In this way, the generation of the first subframe containing only the low-frequency component is completed.

Then, in step S606, the difference detector 104 calculates the second subframe as a difference image by subtracting the first subframe generated from the input frame 101. In the example shown in FIG. 5, the waveform 505 indicates the difference waveform, and this difference waveform is the second subframe containing the high-frequency component. This embodiment is characterized in that the difference waveform 505 takes no negative value because the minimum value filter is applied.

After that, processes in steps S607 to S611 are the same as those in steps S307 to S311 of FIG. 3, so a repetitive explanation will be omitted.

Figure 6:
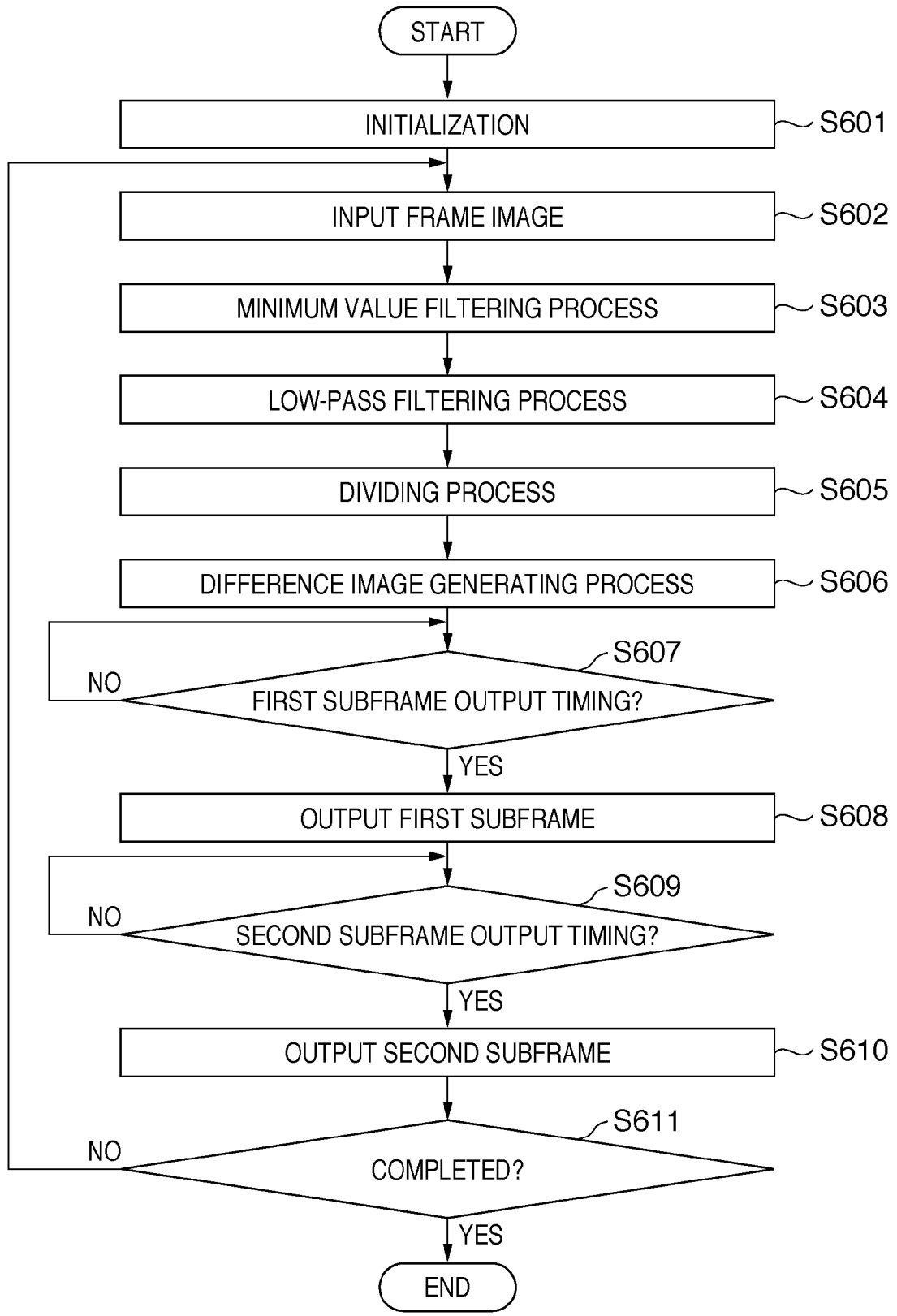
FIG. 6 is a flowchart showing a procedure according to the second embodiment of the present invention.

Note that the subframe output order explained in the flowchart shown in FIG. 6 is merely an example, and the present invention is not limited to this. That is, the first subframe may also be output after the second subframe is output. Note also that the output timing is checked after the two subframes are formed, but the embodiment of the present invention is not limited to this. For example, it is also possible to check the first subframe output timing when the low-pass filtering process is completed in step S605, and generate the second subframe by performing the difference value generating process after the first subframe is output.

In the impulse type display device as described above, the first subframe is displayed for the first 1/120 sec, and the second subframe is displayed for the next 1/120 sec. The apparent waveform on the time average of 1/60 sec is the waveform 506 shown in FIG. 5, that is, the same as that of the input frame.

[Modifications of Second Embodiment]

Modifications of the second embodiment will be explained below with reference to FIGS. 7 to 9.

Figure 7:
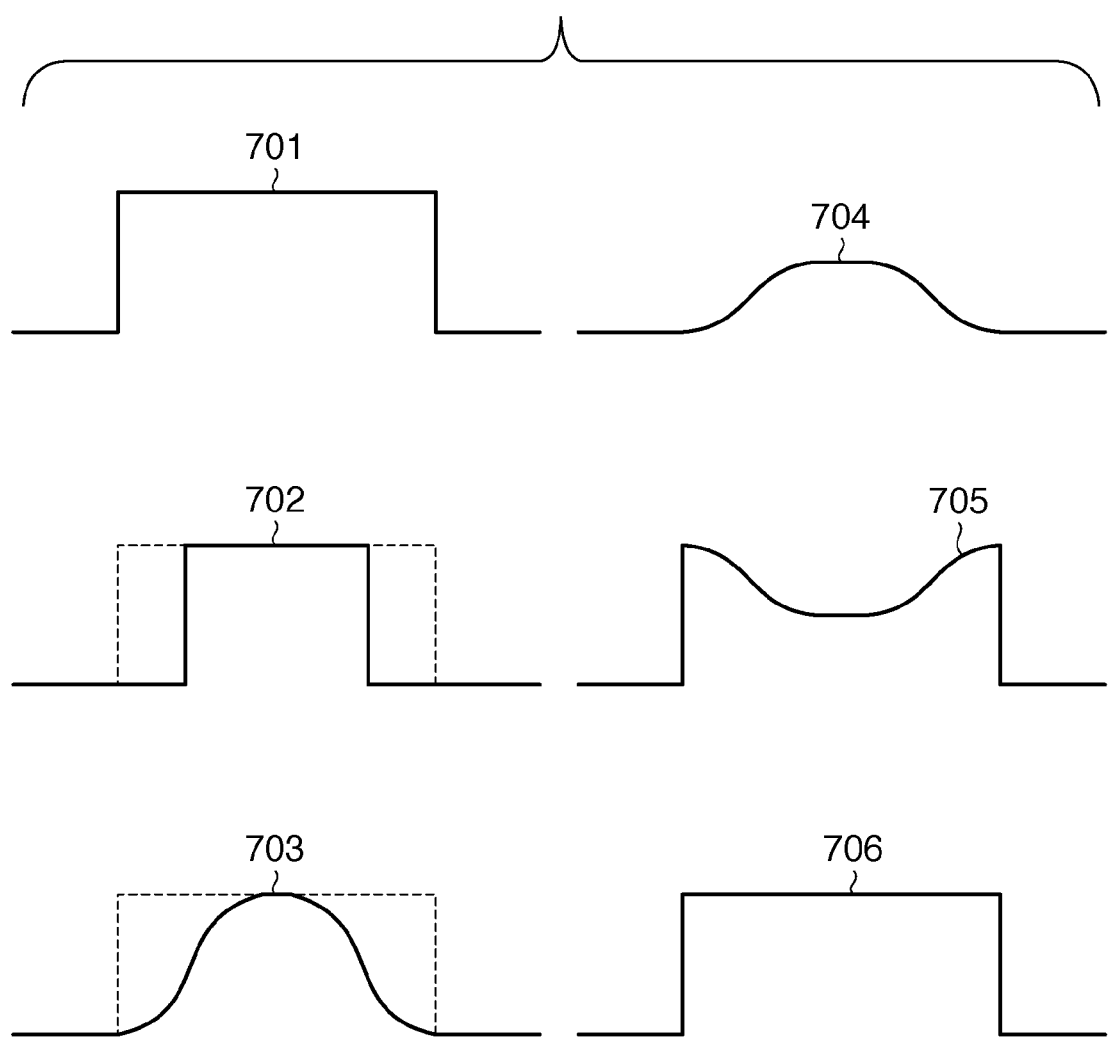
FIG. 7 is a view for explaining processed waveforms according to a modification of the second embodiment of the present invention.

First, FIG. 7 shows an example in which the characteristics of the minimum value filter and low-pass filter are changed into shapes different from those shown in FIG. 5. A waveform 701 shown in FIG. 7 is the same input waveform as the waveform 501 shown in FIG. 5. Referring to FIG. 7, however, a minimum value filter having an application range wider than that used in FIG. 5 (the waveform 502) is used as indicated by a waveform 702, by taking account of the filtering characteristic of the low-pass filtering process performed after that. That is, since the low-pass filter has influence over a broad range, the range of the minimum value filter is widened accordingly.

A waveform 703 shown in FIG. 7 is obtained by applying a low-pass filter having a moderate characteristic to the waveform 702. Processing after that is the same as that shown in FIG. 5. A waveform 704 indicates the first subframe obtained by lowering the level of the waveform 703 to 50%. Also, a waveform 705 indicates the second subframe obtained by subtracting the waveform 704 from the input frame 101. In addition, a waveform 706 is the apparent synthetic waveform and matches the waveform 701.

As described above, the range of influence of the minimum value filter is set equal to or wider than that of the low-pass filter. This makes it possible to prevent the generation of a negative value when generating the second subframe.

The above-mentioned relationships will be explained in more detail below with reference to FIG. 9. That is, the range over which the filter has influence will be explained by using the tap length. A filter graph 901 exhibits the characteristic of the low-pass filter used to generate the waveform 503 shown in FIG. 5. A waveform indicated by the dotted line is an input waveform, and a waveform indicated by the solid line is obtained by performing the filtering process on the input waveform. A sampling point graph 902 exhibits the sampling points of pixels. The filter has effect over the range of five pixels in the horizontal direction. That is, the horizontal tap length of the low-pass filter in this state is 5. Assuming that the low-pass filter has symmetry, the range over which the low-pass filter has influence does not extend from the high-luminance side of the input waveform indicated by the dotted line when the tap length of the minimum value filter is set to 5 as indicated by a filter graph 903.

Similarly, a case in which the tap length of the low-pass filter is 9 as shown in a filter graph 904 and sampling point graph 905 is as follows. In this case, the low-frequency component does not extend from the high-luminance side of the input waveform as indicated by a filter graph 906 when the tap length of the minimum value filter is also set to 9 or more.

As described above, the tap length of the minimum value filter is set at least equal to or larger than that of the low-pass filter. This makes it possible to prevent the generation of a negative value when the signal having undergone the low-pass filtering process is subtracted from the input frame. Note that the number of taps (the tap length) in the horizontal direction has been explained above for the sake of simplicity. When performing the filtering process in a block, however, the number of taps can be determined based on the size of the block.

In the actual minimum value filtering process and low-pass filtering process, the number of taps may also be set in the vertical direction. Let a natural number N be the number of taps of the low-pass filtering process in the vertical direction, and a natural number M be the number of taps of the low-pass filtering process in the horizontal direction. N and M can take the same value or different values. For example, it is possible to set (N,M)=(5,5), (7,5), or (5,7).

Also, let a natural number N' be the number of taps of the minimum value filter in the vertical direction, and a natural number M' be the number of taps of the minimum value filter in the horizontal direction. In this case, peripheral pixels exist within a region of the natural number N' in the vertical direction and the natural number M' in the horizontal direction around a pixel of interest. The minimum value filtering process selects a minimum pixel value from the pixels in this region. Note that the natural numbers N' and M' need only be equal to or larger than the natural numbers N and M, respectively. The above-mentioned concept concerning the number of taps similarly applies to the minimum value filtering process and low-pass filtering process in the first embodiment.

On the other hand, the tap length of the minimum value filter need not always be equal to or larger than that of the low-pass filter depending on the form of an actual product. This will be explained below.

A filter graph 907 shown in FIG. 9 indicates a case in which the tap length of the low-pass filter is 9 and that of the minimum value filter is 7 smaller than 9 by 2. In this case, an extension having the width of one pixel may be produced in an edge portion where high luminance changes to low luminance. However, no visual problem may arise even if this extension of the width of one pixel is permitted.

Figure 8:
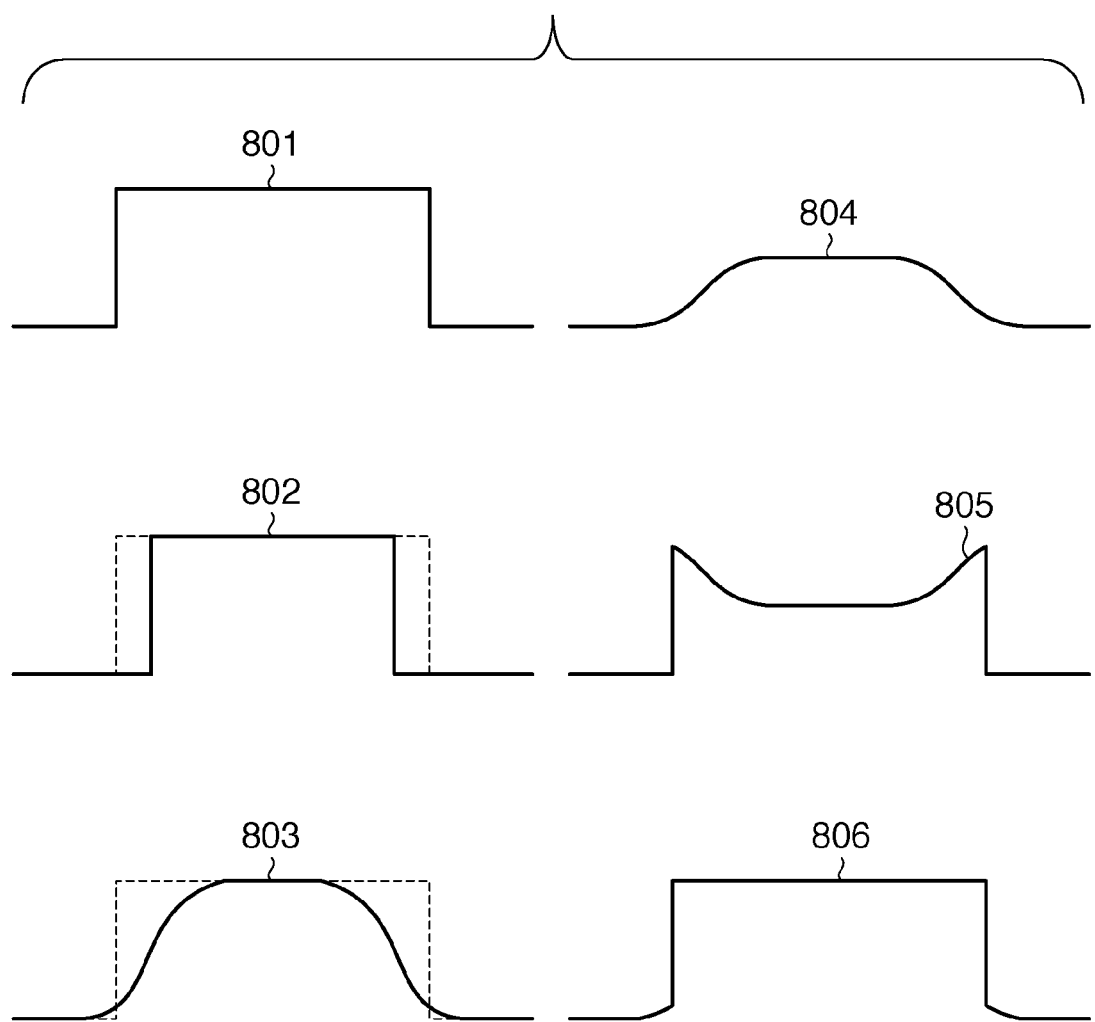
FIG. 8 is a view for explaining processed waveforms according to another modification of the second embodiment of the present invention.
Figure 10:
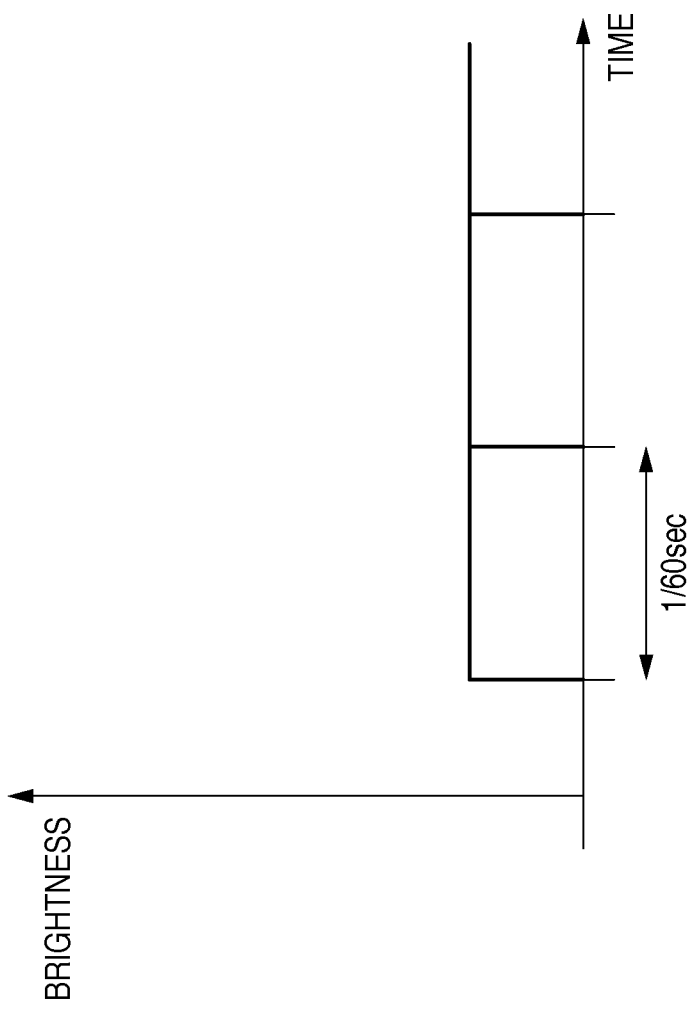
FIG. 10 is a graph for explaining the light emission time of a hold type display device.
Figure 11:
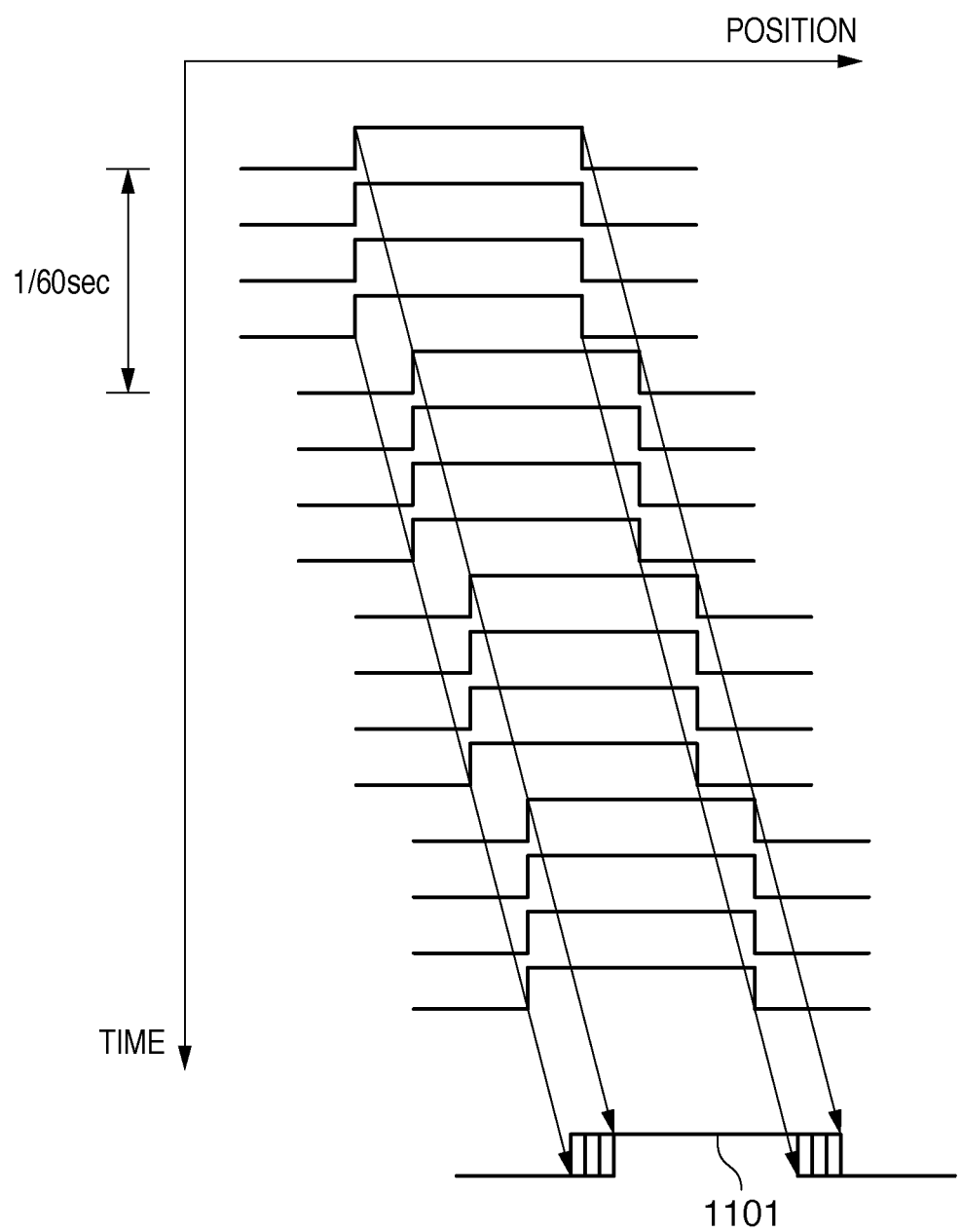
FIG. 11 is a graph for explaining the dynamic characteristic of the hold type display device.
Figure 12:
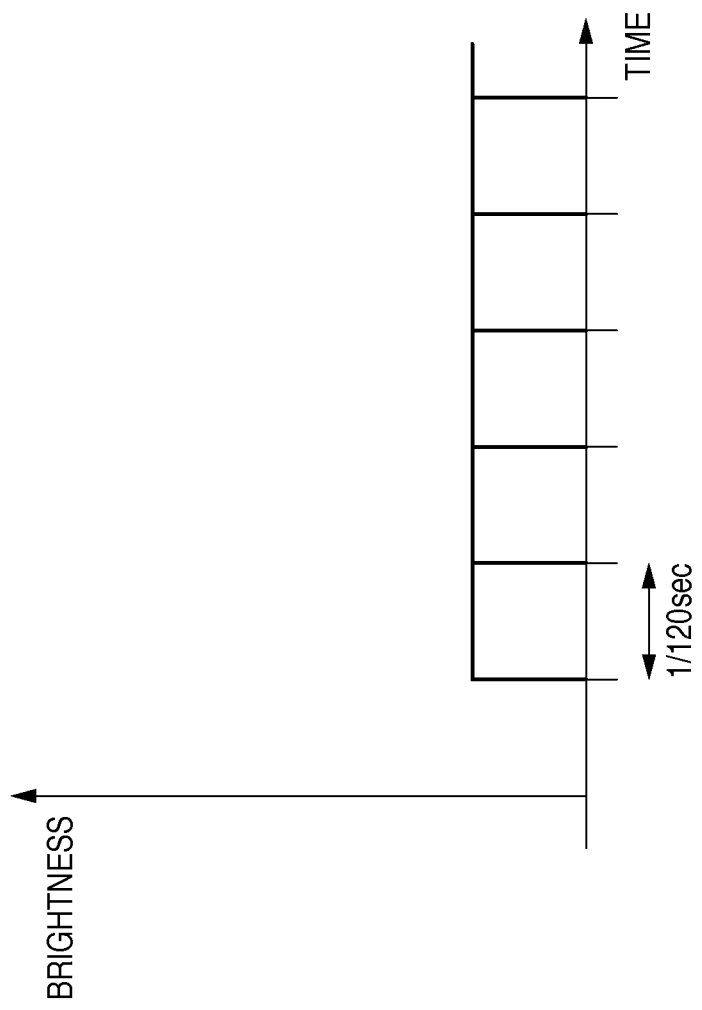
FIG. 12 is a graph for explaining the light emission time when performing double-speed driving of the hold type display device.
Figure 13:
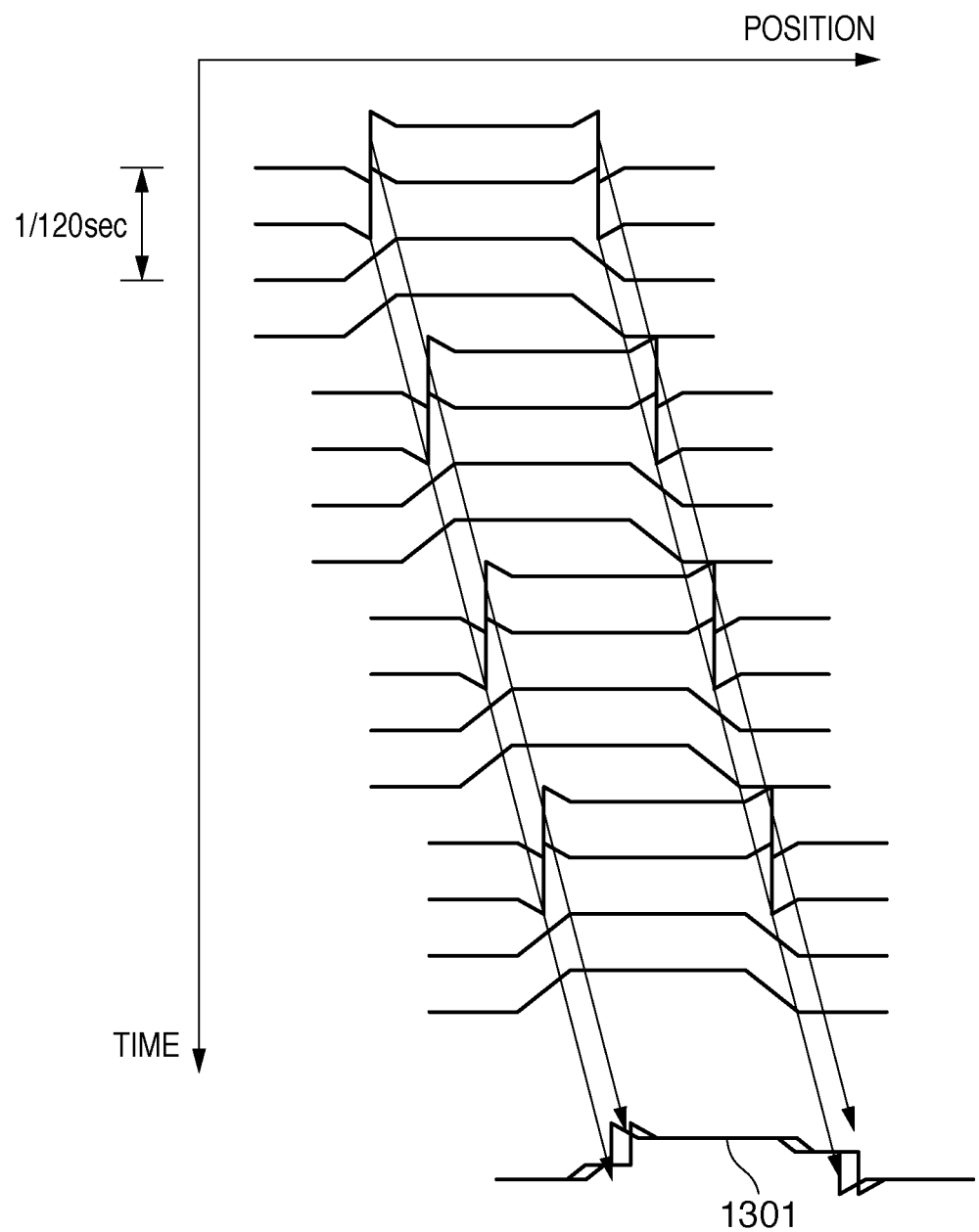
FIG. 13 is a graph for explaining the dynamic characteristic when performing double-speed driving of the hold type display device.
Figure 14:
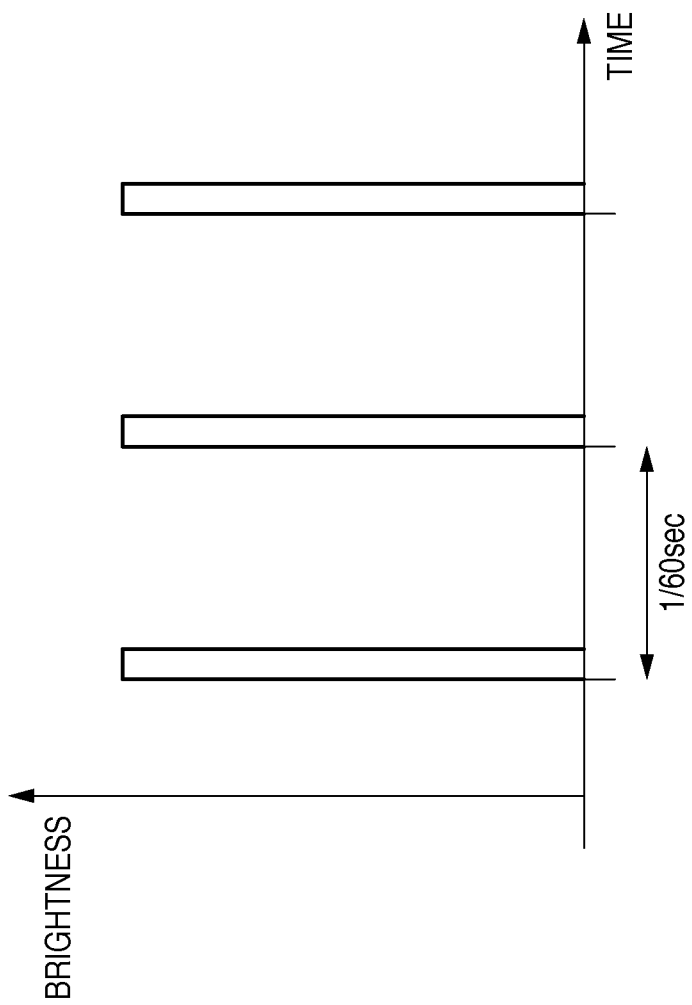
FIG. 14 is a graph for explaining the light emission time of an impulse type display device.
Figure 15:
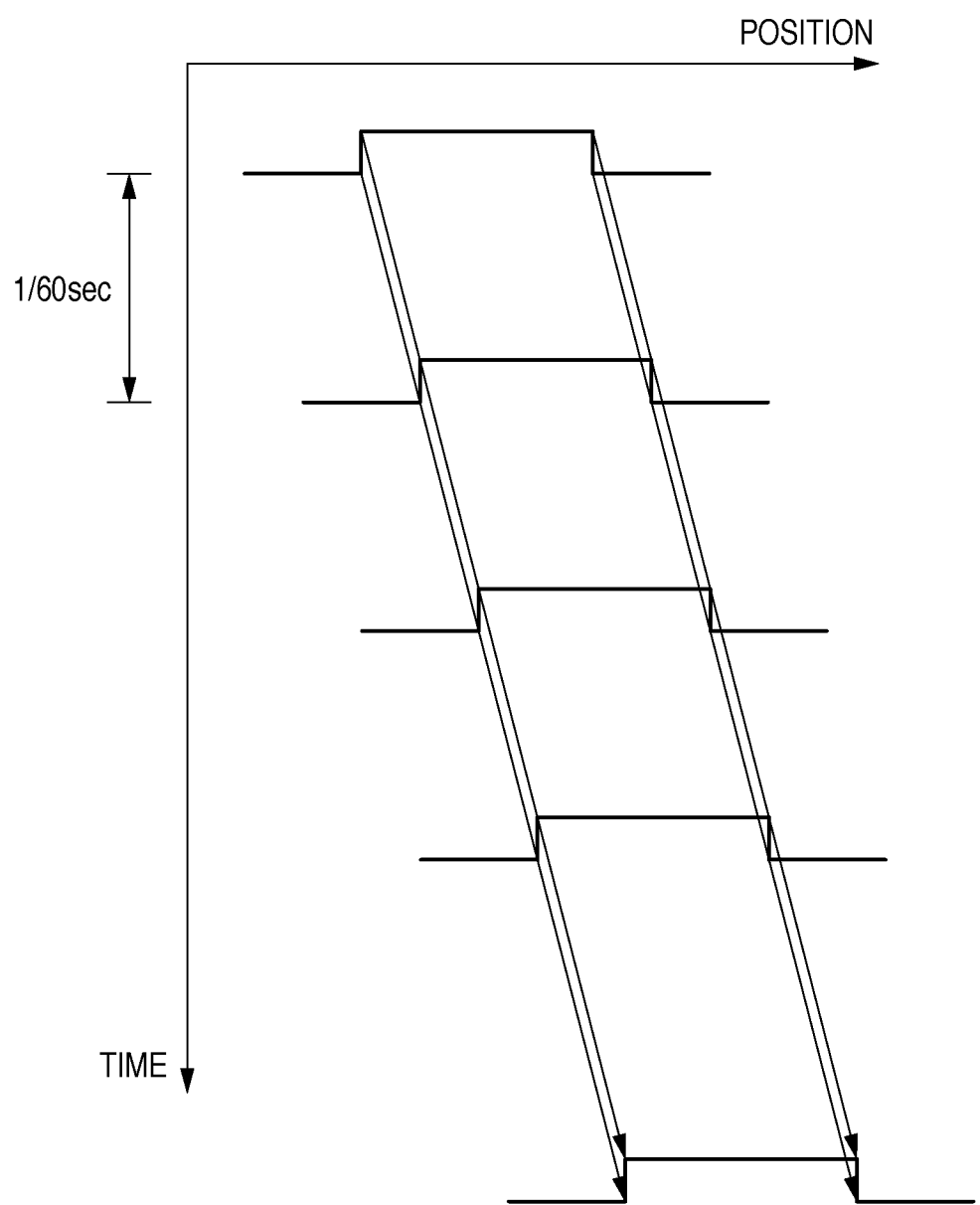
FIG. 15 is a graph for explaining the dynamic characteristic of the impulse type display device.
Figure 16:
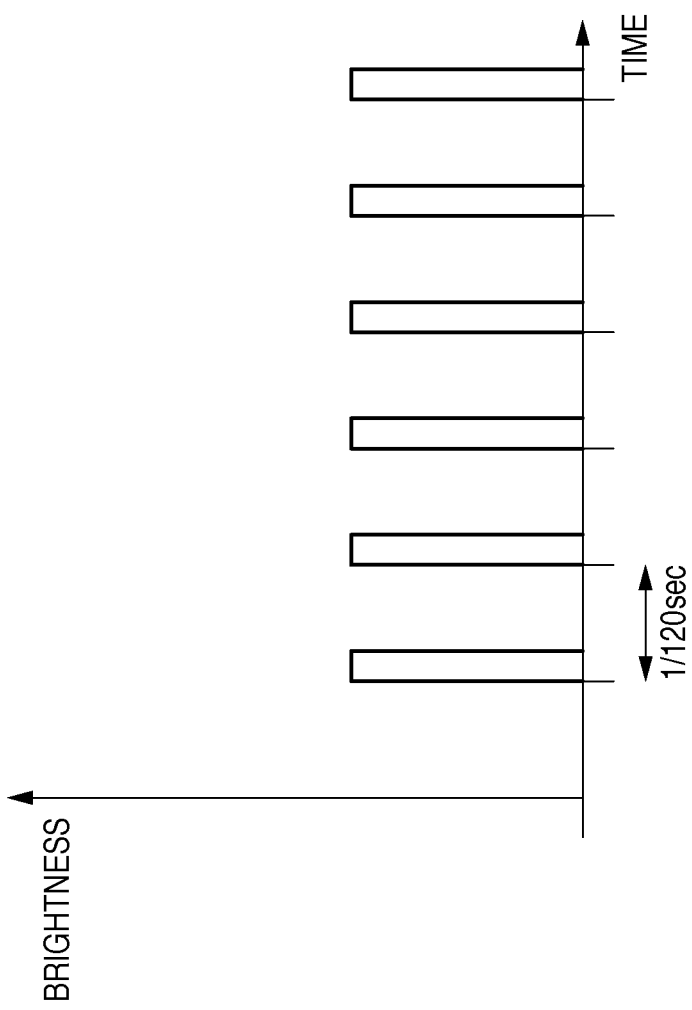
FIG. 16 is a graph for explaining the light emission time when performing double-speed driving of the impulse type display device.
Figure 17:
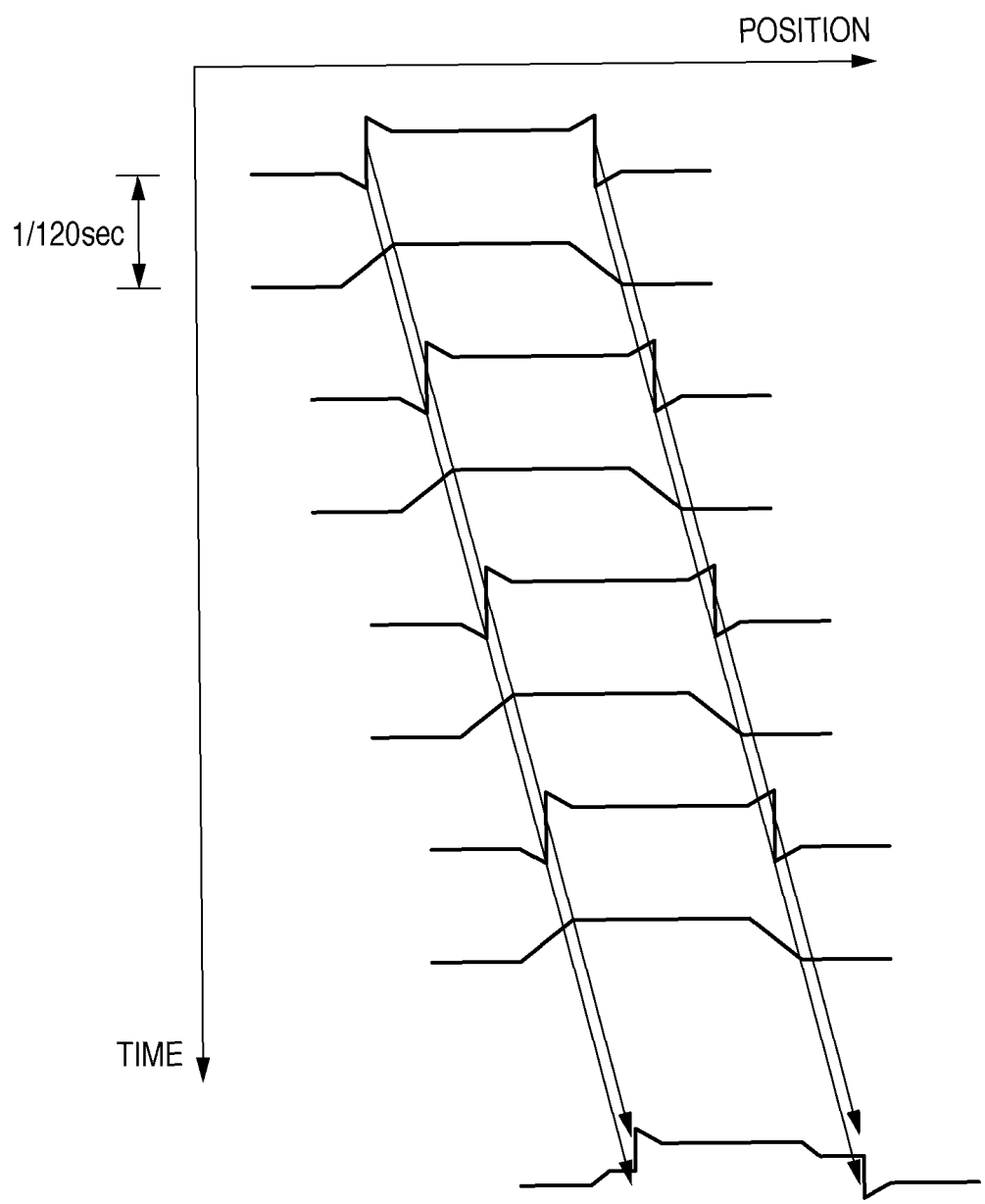
FIG. 17 is a graph for explaining the dynamic characteristic when performing double-speed driving of the impulse type display device.

FIG. 8 is a view for explaining the way the waveform actually looks when the extension of the width of one pixel is produced. A waveform 801 shown in FIG. 8 is an input waveform as in the above explanation. A waveform 802 is obtained by applying a 7-tap minimum value filter. A waveform 803 is the result of a 9-tap, low-pass filtering process, in which an extension of one pixel is produced on the low-luminance side of the input waveform. A waveform 804 is the first subframe obtained by lowering the level of the waveform 803 to 50%. A waveform 805 is obtained by subtracting the first subframe having the waveform 804 from the input waveform 801. In the waveform 805, an extended portion is zero because it cannot take a negative value. Accordingly, the apparent synthetic image has a waveform 806 that is the sum of the waveforms 804 and 805 and is not the same as the waveform 801. That is, the waveform 806 has a value higher than the original value by the width of one pixel on the low-luminance side.

The number of taps can be considered two-dimensionally in the vertical and horizontal directions in this case as well. In the above example, the natural number N' can be made smaller than the natural number N, the natural number M' can be made smaller than the natural number M, or the natural numbers N' and M' can be made smaller than the natural numbers N and M, respectively. Note that N'=N−2 and M'=M−2 are favorable in order to minimize the extension of the pixel width.

Assuming that this example is an image having a white character in a black background, the contours (edges) of the white character are slightly blurred. However, a viewer cannot perceive this blur in many cases depending on the number of pixels forming the screen or the size of the screen. As described above, it is possible not only to design an apparatus so that no blur is theoretically generated in a still image, but also to design an apparatus so as to permit a slight blur that is visually hardly perceivable. That is, it is possible to freely design an apparatus in accordance with the form of an actual product.

Third Embodiment

FIG. 20 is a view showing an example of the hardware configuration of a computer as an image processing apparatus for implementing the first and second embodiments of the present invention.

Referring to FIG. 20, a CPU 2001 controls the operation of an image processing apparatus 2000 by executing the OS, application programs, and the like stored in an external memory (hard disk) 2007. Note that the CPU 2001 functions as the minimum value filtering unit 102, low-pass filter processor 103, and difference detector 104 shown in FIG. 1 and as the division ratio processor shown in FIG. 4 by executing the corresponding programs, thereby implementing the processes shown in FIGS. 3 and 6. The CPU 2001 also performs control to temporarily store information, files, and the like necessary to execute the programs in a RAM 2003. In addition, the CPU 2001 can implement the switching circuit 107 shown in FIG. 1 by controlling the operation of the RAM 2003.

Programs such as a basic I/O program are stored in a ROM 2002. The RAM 2003 functions as, for example, a main memory and work area of the CPU 2001. A network interface (I/F) 2004 communicates with external apparatuses by connecting to a LAN and WAN.

An input device 2005 can include an image sensing device for taking an image of an object and inputting the image, in addition to a mouse and keyboard for receiving input from a user. The image processing apparatus 2000 having this image sensing device can function as a digital camera or digital video camera.

An output device 2006 is a hold type display device such as a liquid crystal display or an impulse type display device such as a field emission type display device. Application programs, driver programs, the OS, control programs, programs for executing the processes corresponding to this embodiment, and the like are stored in the external memory 2007. A system bus 2008 controls the flows of data in the apparatus.

Other Embodiments

Note that the present invention can be applied to an apparatus comprising a single device or to system constituted by a plurality of devices. Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW). As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer. Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-119059, filed Apr. 30, 2008 which is hereby incorporated by reference herein in its entirety.

What is claimed is:

1. An image processing apparatus which converts a frame rate by dividing an input frame into subframes and outputting the subframes, comprising:
at least a processor and memory, cooperating to perform:
a pre-processing step of pre-processing an input frame by copying the input frame to an intermediate frame, setting a block having a predetermined size for a pixel of interest in the intermediate frame, and replacing one pixel value of the pixel of interest in the intermediate frame with a minimum pixel value of neighboring pixels of the pixel of interest in the block within the intermediate frame;
a low-pass filter processing step of generating a first subframe of the input frame by performing a low-pass filtering process on the intermediate frame which has the pixel value of the pixel of interest already replaced in the pre-processing in said pre-processing step;
a generating step of generating a second subframe of the input frame from the first subframe and the input frame; and
a switching step of alternately outputting the first subframe and the second subframe at predetermined times.

2. The apparatus according to claim 1, wherein said generating step includes generating the second subframe by adding a difference between the input frame and the first subframe to the input frame.

3. The apparatus according to claim 1, wherein
said low-pass filter processing step includes generating the first subframe by multiplying a frame as a result of the low-pass filtering process by a predetermined division ratio, and
said generating step includes generating the second subframe by subtracting the first subframe from the input frame.

4. The apparatus according to claim 1, wherein the pixels in the block are determined based on the number of taps in the low-pass filtering process.

5. The apparatus according to claim 4, wherein letting a natural number N be the number of taps of the low-pass filtering process in a vertical direction and a natural number M be the number of taps in a horizontal direction, the block is a region of a natural number N' in the vertical direction and a natural number M' in the horizontal direction around the pixel of interest, the natural number N' being not less than the natural number N, and the natural number M' being not less than the natural number M.

6. The apparatus according to claim 4, wherein letting a natural number N be the number of taps of the low-pass filtering process in a vertical direction and a natural number M be the number of taps in a horizontal direction, the block is a region of a natural number N' in the vertical direction and a natural number M' in the horizontal direction around the pixel of interest, the natural number N' being less than the natural number N, and the natural number M' being less than the natural number M.

7. An image processing method in an image processing apparatus which converts a frame rate by dividing an input frame into subframes and outputting the subframes, comprising:
a preprocessing step of preprocessing an input frame by copying the input frame to an intermediate frame, setting a block having a predetermined size for a pixel of interest in the intermediate frame, and replacing one pixel value of the pixel of interest in the intermediate frame with a minimum pixel value of neighboring pixels of the pixel of interest in the block within the intermediate frame;
a low-pass filter processing step of generating a first subframe of the input frame by performing a low-pass filtering process on the intermediate frame which has the pixel value of the pixel of interest already replaced in the pre-processing in said pre-processing step;
a generating step of generating a second subframe of the input frame from the first subframe and the input frame; and
a switching step of alternately outputting the first subframe and the second subframe at predetermined times.

8. The method according to claim 7, wherein in said generating step, the second subframe is generated by adding a difference between the input frame and the first subframe to the input frame.

9. The method according to claim 7, wherein
in said low-pass filter processing step, the first subframe is generated by multiplying a frame as a result of the low-pass filtering process by a predetermined division ratio, and
in said generating step, the second subframe is generated by subtracting the first subframe from the input frame.

10. The method according to claim 7, wherein the pixels in the block are determined based on the number of taps in the low-pass filtering process.

11. The method according to claim 10, wherein letting a natural number N be the number of taps in the low-pass filtering process in a vertical direction and a natural number M be the number of taps in a horizontal direction, the block is a region of a natural number N' in the vertical direction and a natural number M' in the horizontal direction around the pixel of interest, the natural number N' being not less than the natural number N, and the natural number M' being not less than the natural number M.

12. The method according to claim 10, wherein letting a natural number N be the number of taps in the low-pass filtering process in a vertical direction and a natural number M be the number of taps in a horizontal direction, the block is a region of a natural number N' in the vertical direction and a natural number M' in the horizontal direction around the pixel of interest, the natural number N' being less than the natural number N, and the natural number M' being less than the natural number M.

13. A non-transitory computer-readable storage medium storing a program for causing a computer to execute an image processing method in an image processing apparatus which converts a frame rate by dividing an input frame into subframes and outputting the subframes, said method comprising:
a preprocessing step of preprocessing an input frame by copying the input frame to an intermediate frame, setting a block having a predetermined size for a pixel of interest in the intermediate frame, and replacing one pixel value of the pixel of interest in the intermediate frame with a minimum pixel value of neighboring pixels of the pixel of interest in the block within the intermediate frame;
a low-pass filter processing step of generating a first subframe of the input frame by performing a low-pass filtering process on the intermediate frame which has the pixel value of the pixel of interest already replaced in the pre-processing in said pre-processing step;

a generating step of generating a second subframe of the input frame from the first subframe and the input frame; and a switching step of alternately outputting the first subframe and the second subframe at predetermined times.

14. An image processing apparatus comprising:

at least a processor and memory, cooperating to perform:

an input step of inputting a plurality of frames;

a replacing step of replacing one pixel value of a pixel of interest in one of the plurality of frames with a pixel value, smaller than that of the pixel of interest, of pixel values of all pixels in a block within the one frame including the pixel of interest, and saving the result into an intermediate frame keeping the one frame intact;

a generating step of generating a high-frequency enhanced image and a low-frequency enhanced image from the one frame and the intermediate frame, in which intermediate frame the pixel value of a pixel has been replaced in said replacing step; and an output step of alternately outputting the high-frequency enhanced image and the low-frequency enhanced image.

15. An image processing method for an image processing apparatus, comprising:

an input step of inputting a plurality of frames;

a replacing step of replacing one pixel value of a pixel of interest in one of the plurality of frames with a pixel value, smaller than that of the pixel of interest, of pixel values of all pixels in a block within the one frame including the pixel of interest, and saving the result into an intermediate frame keeping the one frame intact;

a generating step of generating a high-frequency enhanced image and a low-frequency enhanced image from the one frame and the intermediate frame, in which intermediate frame the pixel value of a pixel has been replaced in said replacing step; and an output step of alternately outputting the high-frequency enhanced image and the low-frequency enhanced image.

16. A non-transitory computer-readable storage medium storing a program for causing a computer to execute an image processing method for an image processing apparatus, said method comprising:

an input step of inputting a plurality of frames;

a replacing step of replacing one pixel value of a pixel of interest in one of the plurality of frames with a pixel value, smaller than that of the pixel of interest, of pixel values of all pixels in a block within the one frame including the pixel of interest, and saving the result into an intermediate frame keeping the one frame intact;

a generating step of generating a high-frequency enhanced image and a low-frequency enhanced image from the one frame and the intermediate frame, in which intermediate frame the pixel value of a pixel has been replaced in said replacing step; and an output step of alternately outputting the high-frequency enhanced image and the low-frequency enhanced image.

* * * * *